Figure 1:
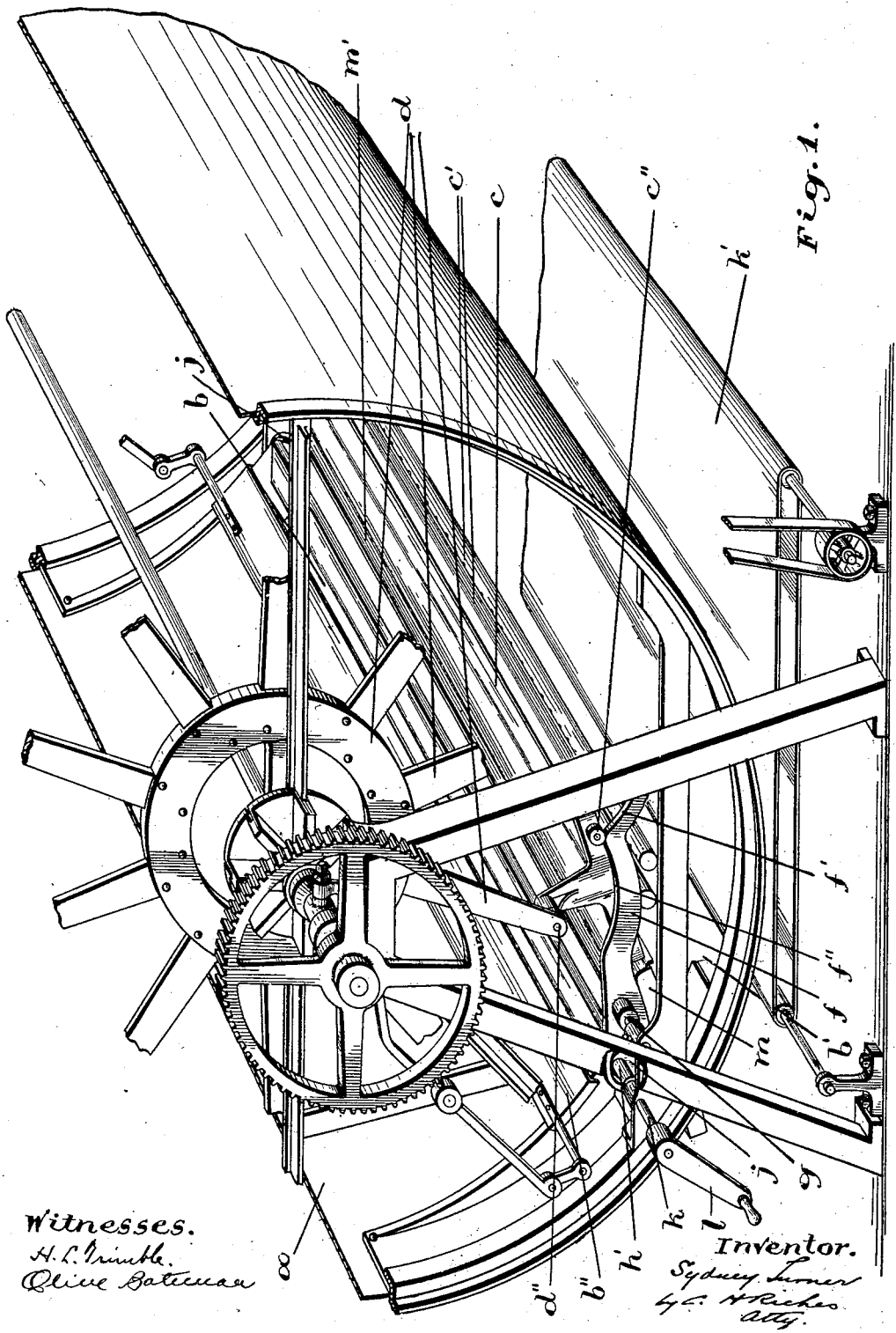

UNITED STATES PATENT OFFICE.

SYDNEY TURNER, OF TORONTO, ONTARIO, CANADA, ASSIGNOR TO JOHN DRYSDALE NASMITH, OF TORONTO, CANADA.

BAKING-OVEN.

977,347.  Specification of Letters Patent.  Patented Nov. 29, 1910.

Application filed August 24, 1909, Serial No. 514,467. Renewed October 19, 1910. Serial No. 587,996.

*To all whom it may concern:*

Be it known that I, SYDNEY TURNER, of the city of Toronto, in the county of York and Province of Ontario, Canada, have invented certain new and useful Improvements in Baking-Ovens; and I hereby declare that the following is a full, clear, and exact description of the same.

This invention relates to certain new and useful improvements in that class of baking ovens shown and described in Letters Patent of the United States, Number 846,046, issued to John Drysdale Nasmith, on the 5th of March 1907, and essentially consisting of a casing in which are rotatable baking shelves mounted to collectively revolve with a rotatable support from which each baking shelf is independently suspended, to continually maintain a substantially horizontal position during the revolution of the rotatable support; the casing being provided with a doorway controlled by a door balanced to remain in an open or closed position and movable in an arc eccentric to the casing, and notched arms to be positioned in the path of the baking shelves to upset the latter and cause them to dump their contents through the oven front on a dumping tray located exteriorly of the oven.

The present invention has provision for the dumping of the contents of the baking shelves through the oven bottom, and in carrying out the present invention I employ the rotatable baking shelves, rotatable support, and balanced door above mentioned, but I have discarded the notched arms for upsetting the baking shelves, and have substituted for them two rockable dumper arms fixed to a rock shaft journaled in bearings forming part of the oven structure, the dumper arms having inclined surfaces to tilt the baking shelves when they reach the dumping place, and having curved surfaces which engage the baking shelves and steady them when returning to their normal position. I also employ a segment of the oven casing as a receiving tray and pivot this segment to the oven structure so that when in its receiving position it will be in the same inclined plane as the baking shelf when turned by the dumper arms, and when in its normal position, it will form part of the oven casing, the segment forming the receiving tray being located below the center of the oven structure so that when in its normal position, it will deliver its contents downward through the interior of the oven, to the opening at the bottom thereof, through which they descend to the endless conveyer to be carried to the place of delivery. I also provide the dumper arms with an operating mechanism, and connect this operating mechanism with the pivoted segment of the oven casing, so that when the operating mechanism is actuated to position the dumper arms in the path of the baking shelves, it will simultaneously position the pivoted segment to receive the contents of the baking shelves when dumped, and which when actuated to move the dumper arms from the path of the baking shelves, will restore the pivoted segment to its normal position.

Figure 2:
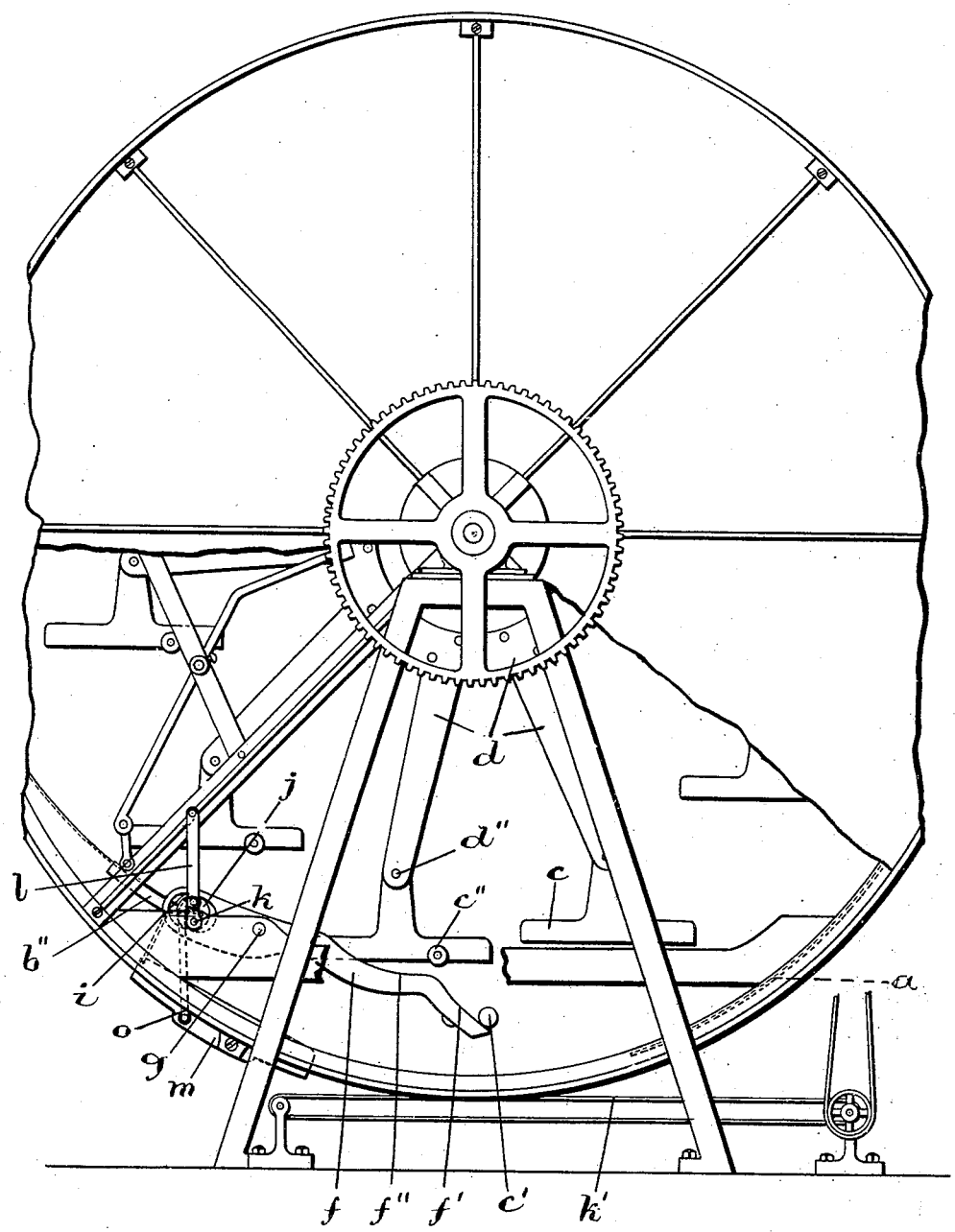
Figure 3:
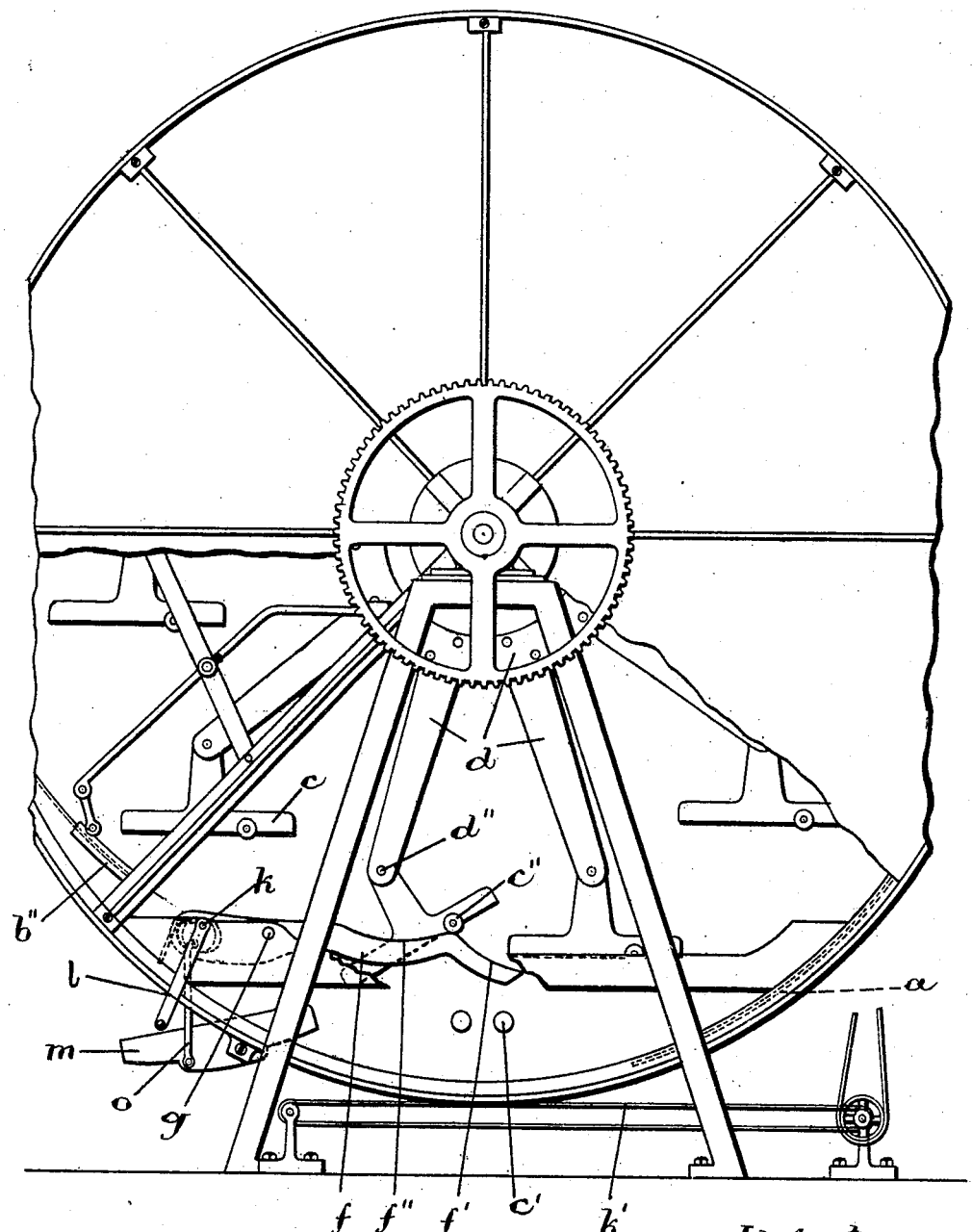

For an understanding of the invention reference is to be had to the following description and to the accompanying drawings in which:

Figure 1, is a perspective view of part of the baking oven showing the construction and arrangement of the present improvements. Fig. 2, is an end elevation showing the normal, *i. e.* the inoperative, position of the parts. Fig. 3, is a similar view to Fig. 2, showing the operative position of the parts.

Like characters of reference refer to like parts throughout the specification and drawings.

The lower part of the oven casing $a$ is formed with an opening $b'$ through which the heat ascends from the burners $c'$ to the interior of the oven, and through which the contents of the shelves descend to the endless conveyer $k'$. In the front of the oven casing $a$ is a doorway $b$ controlled by a door $b''$ balanced to remain in an open or closed position, and revoluble within the oven casing is a reel $d$ from which are suspended the baking shelves $c$. These features of the present invention are similar to those shown and described in the above mentioned patents, and consequently it will not be necessary to further describe them.

Journaled within the oven casing $a$ between the doorway $b$ and the opening $b'$ is a rock shaft $g$ and fixed to the rock shaft are dumper arms $f$. In the dumper arms at one side of the rock shaft, are slots $i$, and at the other side of the rock shaft, the dumper arms are formed with inclined dumping surfaces $f'$ which engage the idlers $c''$ carried by the baking shelves to upset the latter during the revolution of the reel and with curved steadying surfaces $f''$ which engage the same idlers when they have passed the inclined dumping surfaces, and steady the baking shelves as they re-assume their horizontal position.

Fixed on a shaft $h$ mounted in bearings $h'$ are eccentrics $j$ operating in the slots $i$ to rock the dumper arms $f$ and in the oven casing $a$ is a pivoted section $m$ in line with the place where the shelves are dumped. Connecting the pivoted section $m$ and the eccentrics $j$ are links $o$ by which the segment is positioned to form part of the oven casing, or to serve as a receiving tray for the contents of the baking shelves when dumped, the pivoted section having a flange $m'$ which serves as a stop to prevent its contents being dumped through the opening formed by the segment when in its receiving position.

The operation of the invention is as follows: The turning of the eccentrics through the agency of the cranks $l$ simultaneously rocks the dumper arms $f$ to elevate the inclined dumping surfaces $f'$ into the path of the baking shelves, and moves the pivoted segment $m$ into an open position, the segment being so pivoted, that when in its open position, it is in the same inclined plane as the baking shelf in its dumped position, and serves as a receiving tray for the contents of the baking shelves. The idlers of the baking shelves move along the inclined dumping surfaces $f'$ and their engagement therewith causes the baking shelves to turn on their pivotal connections $d''$ with the reel $d$, and change from a horizontal to an inclined position. When the idlers reach the end of the inclined dumping surfaces $f'$ they are engaged by the steadying surfaces $f''$ which retard the swinging motion of the baking shelves when re-assuming their horizontal position. By turning the eccentrics in the opposite direction to that above described, the dumper arms are brought back into an inoperative position, i. e. out of the path of the baking shelves, and the pivoted segment is brought back into the line of the casing, the contents of the pivoted segment then sliding downwardly in the oven and through the opening $b'$ to the endless conveyer $k'$ which carries them to the place of delivery.

Having thus fully described my invention what I claim as new and desire to secure by Letters Patent is:

1. In a baking oven in combination, a rotatable support, baking shelves carried thereby, means for dumping the baking shelves, and an oven casing having a segment movable into the same plane as the baking shelves in their dumped position.

2. In a baking oven in combination, a rotatable support, baking shelves carried thereby, dumping means to upset the baking shelves at the dumping place, an oven casing having a segment movable into the same plane as the baking shelves in their dumped position, and operable means for simultaneously positioning the dumping means and the oven casing segment.

3. In a baking oven in combination, a rotatable support, baking shelves rotatably connected thereto, a rock shaft, dumper arms mounted on the rock shaft having inclined surfaces to turn the baking shelves into a dumped position and surfaces to steady the baking shelves when re-assuming their horizontal position, means to position the dumper arms in and out of the path of the baking shelves, said means consisting of eccentrics to actuate the dumper arms, and means for operating the eccentrics.

4. In a baking oven a rotatable support, baking shelves rotatably connected to the rotatable support, dumping means for turning the baking shelves into a dumped position, an oven casing inclosing the baking shelves and rotatable support having a segment movable into the same plane as the baking shelves in their dumped position, and means to simultaneously position the oven casing segment and the dumping means.

5. In a baking oven in combination, an oven casing, a rotatable support therein, baking shelves carried by the rotatable support and dumper arms having inclined dumping surfaces to engage the baking shelves and dump them, and steadying surfaces engaging the baking shelves to return them to their normal position.

6. In a baking oven in combination, a rotatable support, baking shelves rotatably connected thereto, a rock shaft, dumper arms mounted on the rock shaft having inclined surfaces to engage the baking shelves and turn them into a dumped position, and curved surfaces engaging the baking shelves to return them to a horizontal position, and means to position the dumper arms in and out of the path of the baking shelves.

7. In a baking oven, an oven casing having a delivery opening, a rotatable support therein, baking shelves rotatably suspended from the rotatable support, a rockable dumper arm, to engage and upset the baking shelves as they approach the delivery opening, provided with a curved surface to steady the baking shelves when reassuming their carrying position.

Toronto, August 17th, 1909.

SYDNEY TURNER.

Signed in the presence of—
C. H. RICHES,
H. L. TRIMBLE.